United States Patent [19]
Thomason et al.

[11] Patent Number: 5,895,500
[45] Date of Patent: Apr. 20, 1999

[54] DATA PROCESSING SYSTEM WITH REDUCED LOOK-UP TABLE FOR A FUNCTION WITH NON-UNIFORM RESOLUTION

[75] Inventors: Graham G. Thomason; Rogatus H. H. Wester; Marnix C. Vlot, all of Eindhoven, Netherlands

[73] Assignee: U.S. Philips Corporation, New York, N.Y.

[21] Appl. No.: 08/858,332

[22] Filed: May 19, 1997

Related U.S. Application Data

[63] Continuation of application No. 08/274,944, Jul. 14, 1994, abandoned.

[30] Foreign Application Priority Data

Jul. 16, 1993 [EP] European Pat. Off. ............ 93202092

[51] Int. Cl.$^6$ ............................................. G06F 12/10
[52] U.S. Cl. ................... 711/206; 711/202; 711/205; 711/207; 360/78.07
[58] Field of Search ......................... 711/202, 205, 711/206, 207; 360/78.07

[56] References Cited

U.S. PATENT DOCUMENTS

| | | | |
|---|---|---|---|
| 4,486,797 | 12/1984 | Workman | 360/78.07 |
| 5,123,101 | 6/1992 | Sindhu | 711/207 |
| 5,313,611 | 5/1994 | Franklin et al. | 711/206 |

FOREIGN PATENT DOCUMENTS 0220005  4/1987  European Pat. Off. .......... G06F 1/02

*Primary Examiner*—Eddie P. Chan
*Assistant Examiner*—T. V. Nguyen
*Attorney, Agent, or Firm*—Peter Verdonk

[57] ABSTRACT

A data processing system with a look-up table means for implementing a transfer function with non-uniform resolution comprises a memory to store a plurality of function data; an input to receive external address words for operating on the memory; and an output to provide the function data. The look-up table means comprises a converging means between the input and the memory for mapping specific ones of the external address words onto a specific one of internal address words to access the memory. This greatly reduces memory size. If the transfer function has a symmetry property, a symmetry-handling means further reduces the memory size.

5 Claims, 9 Drawing Sheets

| a3.a2.a1.a0= | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| x = | 0 | 1 | 2 | 3 | 0 | 1 | 2 | 3 | 0 | 1 | 2 | 3 | 0 | 1 | 2 | 3 |
| y = | 0 | 0 | 0 | 0 | 1 | 1 | 1 | 1 | 2 | 2 | 2 | 2 | 3 | 3 | 3 | 3 |
FIG. 14
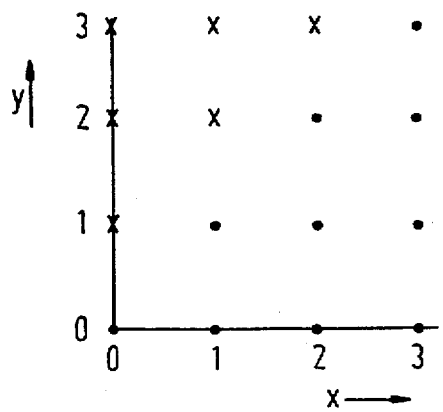
FIG. 15
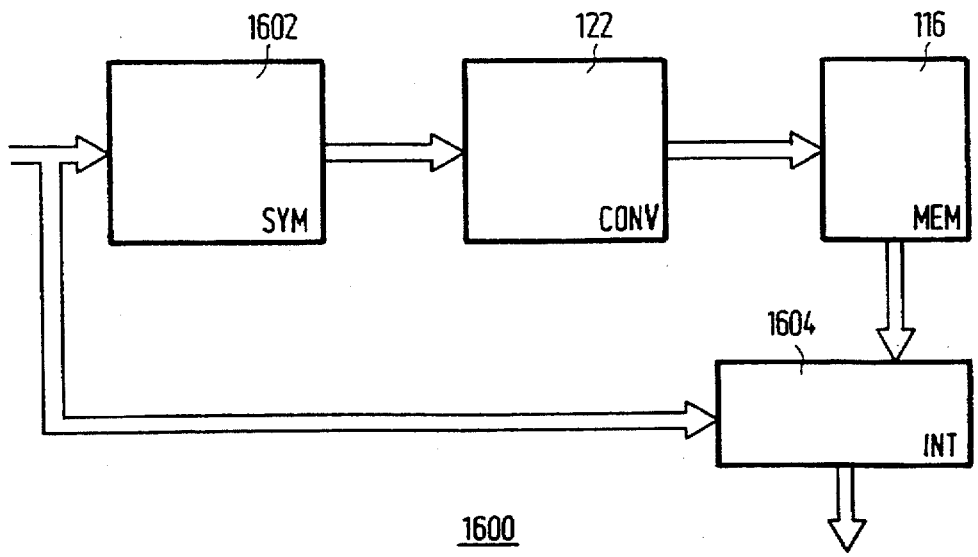
FIG. 16

DATA PROCESSING SYSTEM WITH REDUCED LOOK-UP TABLE FOR A FUNCTION WITH NON-UNIFORM RESOLUTION

This is a continuation of application Ser. No. 08/274,944, filed Jul. 14, 1994, now abandoned.

BACKGROUND OF THE INVENTION

1. Field Of The Invention

The invention relates to a data processing system with a look-up table means for implementing a transfer function with non-uniform resolution, the look-up table means having a memory to store a plurality of function data; an input to receive external addresses for operating the memory; and an output to provide the function data in response to the external addresses.

2. Background Art

Look-up tables are well known devices to implement a predetermined relationship, called a "transfer function" hereinafter, between input data and output data. The look-up table's advantage resides in the fact that substantive real-time processing power is avoided or at least reduced as compared with what would be needed if an algorithm were to be executed in real time. Especially with regard to non-linear transfer functions a look-up table could save a substantial amount of time and/or processing power. Therefore, look-up tables are fast and simple functional building blocks for use in a data processing system.

A look-up table, however, may need a high memory capacity to store large amounts of function data. A large memory in an IC embodiment of a look-up table gives rise to, among other things, a large substrate area, extensive peripheral circuitry such as address decoders and buffers, long supply leads and long signal leads, etc. These aspects degrade system performance and increase the system's size and cost.

A way of reducing a look-up table's memory size is disclosed in U.S. Pat. No. 4,486,797. This prior art document describes a control system to move a load from one position to another position according to a predetermined transfer function, namely a velocity curve. A discrepancy between the current position and the desired position of the load generates an address to access a look-up table. The look-up table thereupon provides a group of digitized values indicative of the velocity curve to be traversed by the load. The domain of the transfer function used, i.e., the range of possible positions, is divided into a sequence of segments. Each next segment is half the size of the preceding segment. For each segment there is stored in the look-up table a fixed number of values for the velocity curve associated with that segment, each segment containing the same fixed number of values. The non-uniform segmentation and the fixed number of velocity values per segment accounts for a non-uniform resolution of the transfer function. The resolution is stepwise increased towards the low velocity portion of the velocity curve. Thus, the memory size is reduced by means of storing a sufficient amount of data distributed non-uniformly over the parameter range in order to omit superfluous data where fine-tuning is not crucial.

The prior art device produces a control signal (a group of digitized values) in two cycles: first the relevant segment and thereupon the segment's relevant portion are to be determined. This constitutes an essentially slower approach than one with a single-cycle operation. Also, the look-up table is based on decreasing the size of each next segment by a constant factor and keeping the number of velocity curve values the same for each segment. Within each segment, the locations (input to look-up table) and velocity values (output of look-up table) are substantially uniformly distributed. Such an architecture is too rigid to implement more general control applications, such as those wherein a transfer function is non-monotonous. Also, the prior art does not explain how to proceed when the transfer function is a function of two or more independent variables or when several control signals are to be produced. Further, the known architecture prescribes an essentially non-uniform input value distribution throughout the whole input signal value range, requiring circuitry operating non-uniformly throughout this range.

OBJECT OF THE INVENTION

It is therefore an object of the invention to provide a data processing system of the kind mentioned in the preamble, that is faster, simpler, essentially more versatile than the prior art and that is readily implemented without the need for an intricate subdivision of the input signal value range.

SUMMARY OF THE INVENTION

To this end, the invention furnishes a data processing system with a look-up table means for implementing a transfer function with non-uniform resolution, the look-up table means having: a memory to store a plurality of function data; an input to receive external addresses for operating the memory; and an output to provide the function data in response to the external addresses. The invention is characterized, in that the look-up table means comprises a converging means between the input and the memory for mapping specific ones of the external addresses forming a specific address region of an external address domain onto a single specific internal address for accessing the memory.

In the invention, the external addresses are selectively mapped onto a smaller number of internal addresses, in such a way that a number of external addresses is mapped onto a single internal address. As the number of external addresses is larger than the number of internal addresses, memory size is reduced. The group of external addresses forms a logically coherent one-, two- or higher-dimensional specific address region in the external address domain, the latter having a number of dimensions equal to or larger than that of the specific address region.

The external addresses themselves can be created uniformly and in an uncomplicated manner, whereas prescribing the mapping onto the internal addresses generally will be a problem to be dealt with only once at the stage of implementation. This approach leads to simple and fast addressing circuitry. The use of the converging means between the input and the memory renders the look-up table means of the invention highly versatile, especially from the point of view of the manufacturer, as the converging means' functionality is readily adapted to the desired resolution and the task envisaged. Standard building blocks can be employed.

The external address domain can be one- or higher dimensional. In the latter case, an external address may include a concatenation of address words that each represents a respective one of the coordinates to specify a particular point in the domain. Preferably, the specific address region is hypercuboidal. Within this context, the term "hypercuboidal" is meant to cover all of the following as the case may be: a one-dimensional linear address interval; a two-dimensional rectangular address plane; a three-dimensional cuboidal address volume; a higher-dimensional hypercuboidal address region. Although the invention is in principle applicable to map a specific address region with an arbitrary shape onto a single address, a two- or higher-dimensional hypercuboidal shaped region is particularly simple to handle when its bounds are defined by fixed values of respective address words.

Each respective one of the external address words in the concatenation is associated with a respective dimension of the external address domain. The internal address then may be composed of a further concatenation of internal address words. The converging means then is operative to map first and second ones of the external address words, which belong to first and second ones of the specific external addresses and which are associated with a single one of the dimensions, onto a same internal address word.

The transfer function may have two or more independent variables. That is, the transfer function may be two- or more dimensional. Each respective external address word in a full external address then corresponds with a respective independent variable or dimension. In low-resolution regions of the transfer function, lower order bits of the address words for one or more dimensions can be discarded. The saving regarding memory space are expected to be proportionally far higher for transfer functions of a higher number of independent variables, i.e., of a higher dimensionality. Also, the resolution of a two- or more-dimensional transfer function can thus be independently handled per dimension. This admits of a systematic, simple approach of optimizing the look-up table means.

Preferably, the look-up table means is operative to receive the specific external addresses in a digital format. The converging means may be operative by selectively discarding bits of pre-specified ranks in the specific external addresses.

Discarding bits of pre-specified ranks in the specific external addresses, e.g., in the external address words, is a simple way of mapping two or more external addresses onto a single internal address word. Discarding can be simply achieved by the converging means comprising a logic gate that receives a lower number of bits than the number of bits making up the specific external address or external address word supplied to the gate. Alternatively, or supplementarily, the converging means itself may be composed of an ancillary look-up table, located between the input and the memory. Such an embodiment advantageously supports a modular architecture, of particular interest to the manufacturer and designer.

Note that the single internal address word is shorter in bits than the external address words that are mapped on the internal address word. When the specific external addresses are composed of a concatenation of digital external address words as mentioned above, the converging means can be operative to discard bits of respective specified ranks in the specific external address words. The bits to be discarded typically include the least significant bit or bits of the external address word in a pre-specified external address range.

There is generated at most only a single internal address in response to an external address. The converging means may be operative to discard further specific ones of the external addresses in a further specific address region of the external address domain, and to generate no corresponding internal address at all. This could be the case, for example, in a control system wherein the occurrence of the further specific external addresses implies that the system would go beyond any control via the look-up table means. Occurrence of these further specific external addresses could then be used to abort the control upon disabling the system or to start a special procedure to force the system back again into the receptive field of the look-up table means.

Regarding system architecture, the converging means and the memory could be physically separated from one another. Such an approach would be advantageous when using standard building blocks, such as PLAs and memory ICs in an electronic implementation, that are to be combined at the system level. Alternatively, the converging means and the memory could be physically merged with one another at least partially. In an IC embodiment, the converging means could well be merged entirely or partially with the address decoders in the memory in order to save substrate area.

The conversion means itself may be composed of an ancillary look-up table, located between the input and the memory. Further, a plurality of respective look-up table means may be cascaded, one or more thereof being provided with respective converging means.

The invention also is relevant to a memory architecture provided with programmability features. Preferably, at least the converging means or the memory is programmable or, more specifically, user-programmable for adapting the look-up table means to an individual purpose. The converging means may comprise an array of programmable logic gates, e.g. functionally integrated with the address decoder of the memory. A segment of the memory can be used as look-up table, the remaining memory segments may be used for other functionalities required in the data processing system of the invention. The converging means may be made programmable or re-programmable to map a predetermined number of external addresses onto a smaller number of internal addresses, thereby effectively reducing the number of inputs to the memory employed for the look-up table functionality. Alternatively, or in addition, the memory itself may be programmable or re-programmable. For example, the converging means is a hard-wired implementation furnishing a predetermined mapping of the external address space onto the internal address space, whereas the memory is a user-programmable memory permitting the user to appropriately distribute the data over the memory.

Typically, data processors and process controllers benefit from the memory architecture in the invention. For example, a character generator for producing a character image on a display may operate on the basis of retrieving each character from a look-up table. The look-up table stores the character in a particular representation. The mapping of this representation onto the pattern on the display may require high resolution in some areas of the character and a low resolution in others. The invention then provides a way to efficiently use the memory storing the representation. Another example of advantageous use of the memory architecture of the invention is a process controller. A process controller interactively governs a particular process, e.g., chemical or physical, by means of sensing the values of descriptive parameters of the process, generating control signals based on the sensed values, typically non-linearly, and supplying these control signals to steer the process.

The process itself may be robust against varying the resolution of the transfer function for a parameter region of the input signal far away from the desired state of the system. The resolution should typically be highest near the desired optimum state. In other words, the resolution of the transfer function may be made non-uniform without seriously aggravating the process control capability. Fuzzy control, based on fuzzy logic, is a typical example of a control mechanism inherently robust against such selective non-uniform resolution regarding transfer functions.

In addition, the look-up table means is preferably adapted to a symmetry property of the transfer function to reduce memory size even further. The function data in a particular region of the transfer function's domain then are stored in the memory, the function data for the other regions of the domain being produced through a symmetry operation. Details are given below. The non-uniform resolution and the symmetry handling mechanisms both reduce the required memory size and are preferably implemented both in the look-up table means. However, the symmetry handling mechanism and the non-uniform resolution handling mechanism can also be implemented independently from one another and can be used separately.

The non-uniform resolution implementations and the symmetry handling features may be individually combined with interpolation means coupled to the output of the memory for producing intermediate function data that were not stored in the look-up table's memory. This approach provides a maximum reduction of memory size.

BRIEF DESCRIPTION OF THE DRAWINGS

The invention is explained below by way of example and with reference to the accompanying drawing, wherein:

FIGS. 14 and 15 give diagrams for explaining the ROM of FIG. 13; and

FIG. 16 gives an embodiment to obtain a maximum reduction in memory size.

Corresponding or similar features in the drawings are referred to by way of same reference numerals.

DETAILED DESCRIPTION OF THE PREFERRED EMBODIMENTS

Data Processing System

Figure 1:
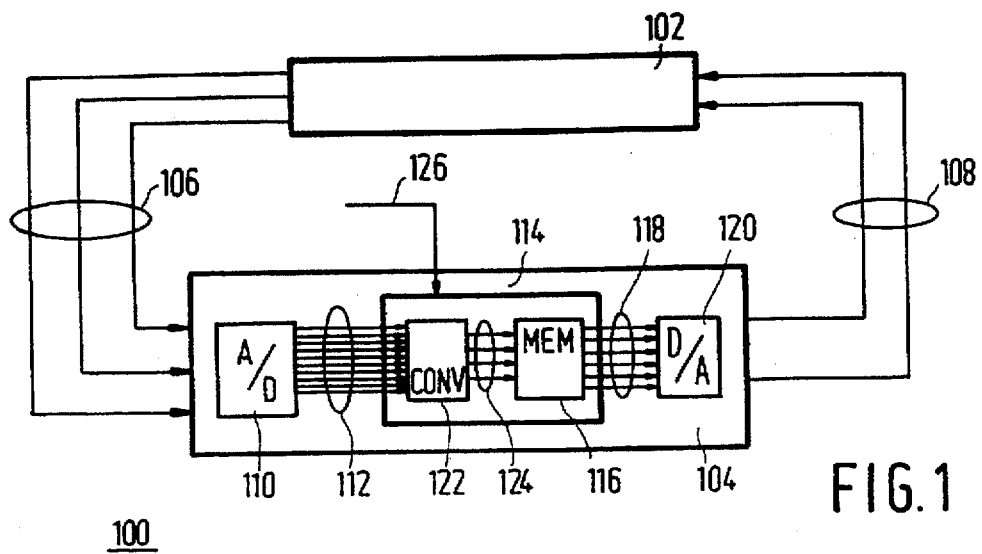
FIG. 1 gives a diagrammatic example of a data processing system in the invention.

FIG. 1 gives an example of a data processing system 100 in the invention. System 100 includes an apparatus 102 to be controlled by a process controller 104. To this end controller 104 receives sensing signals 106 that are indicative of the operational status of apparatus 102. Controller 104 produces control signals 108 on the basis of the actual values of sensing signals 106 and supplies control signals 108 to apparatus 102 in order to have apparatus 102 operating in a pre-specified manner.

Controller 104 may include a converter 110 to convert sensing signals 106 into further signals 112 of an appropriate digital format, suitable to be further operated upon by controller 104. Converter 110 may be an A/D converter, for example. Converter 110 supplies further signals to an input 112 of a look-up table means 114.

Look-up table means 114 functionally includes a memory 116 storing appropriate transfer function data. Look-up table means 114 receives at input 112 further signals as external addresses operating on memory 116 to select the associated transfer function data. The selected transfer function data thereupon are supplied from an output 118 to apparatus 102 via another converter 120, e.g., a D/A converter, in order to convert the transfer function data into control signals 108 of an appropriate format.

According to the invention, look-up table means 114 includes a converging means 122 for mapping specific ones of the external addresses at input 112 onto a single specific one of internal addresses at connections 124 to access memory 116. In this simple manner, a transfer function of non-uniform resolution is implemented using a memory 116 smaller than in the prior art.

Controller 104 may be provided with a program input 126 to write desired function data into memory 116, or to selectively specify the converging operation of converging means 120.

Transfer Functions

Figure 2:
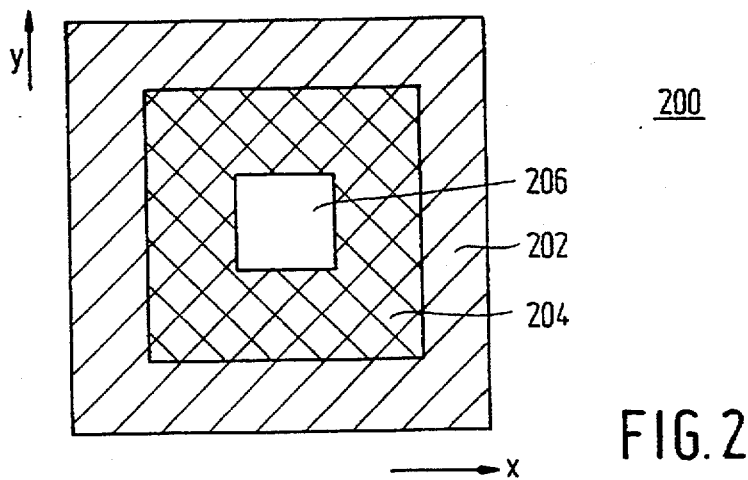
FIGS. 2 and 3 give examples of non-uniform resolution distributions for transfer functions of two independent variables.
Figure 3:
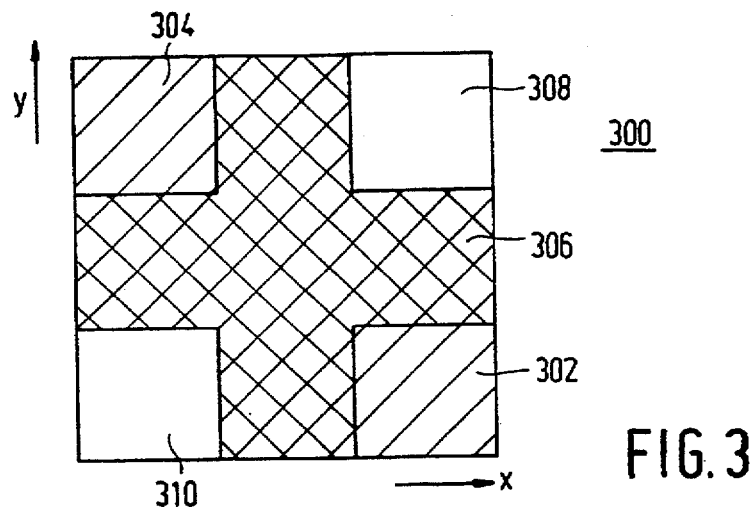

FIGS. 2 and 3 show two examples 200 and 300 of the distribution of the resolution for two-dimensional transfer functions of two independent variables x and y. Each full external address 112 then is composed of two external address words X and Y, that correspond with the respective independent variable or dimension x and y, respectively. For example, the two least-significant bits of the external address words X and/or Y can be discarded to create low-resolution areas 202, 302 and 304 of the transfer functions. The single least-significant bit of the external address words X and/or Y can be discarded to create medium-resolution areas 204 and 306. High-resolution areas 206, 308 and 310 then require the full width of external address words X and Y.

Effectively, the amount of data stored in a look-up table operating under non-uniform resolution conditions is lower than the amount of data when a uniform resolution is employed. Referring to the examples of FIGS. 2 and 3, assume that for both the X and Y external address words the two least-significant bits are discarded in areas 202, 302 and 304. This then would imply that roughly one out of four external address words suffices, i.e., that roughly sixteen times fewer data items are required for storage than under uniform resolution conditions, when pertaining to areas 202, 302 and 304. Similarly, roughly four times fewer data items are required for storage when areas 204 and 306 are involved. It is clear that the savings regarding memory space are to be proportionally far higher for transfer functions of a higher number of independent variables.

Since the n (n=0, 1, 2, ...) least-significant bits of the external address words are discarded, the specific address region of the external address domain that is mapped onto a single internal address generally is a hypercuboidal address region. Within this context, the term "hypercuboidal" is meant to cover all of the following as the case may be: a one-dimensional address interval; a two-dimensional rectangular address region; a three-dimensional cuboidal address region; a higher-dimensional hypercuboidal address region.

Such a mapping of hypercuboidal address region onto a single internal address admits of a simple implementation, since conventional memories, such as semiconductor memories, usually are logically organized to suit rectangular logic address areas. Rectangular address areas may then be subdivided or combined in memory banks to efficiently accommodate the desired address regions.

Architecture Examples

Figure 4:
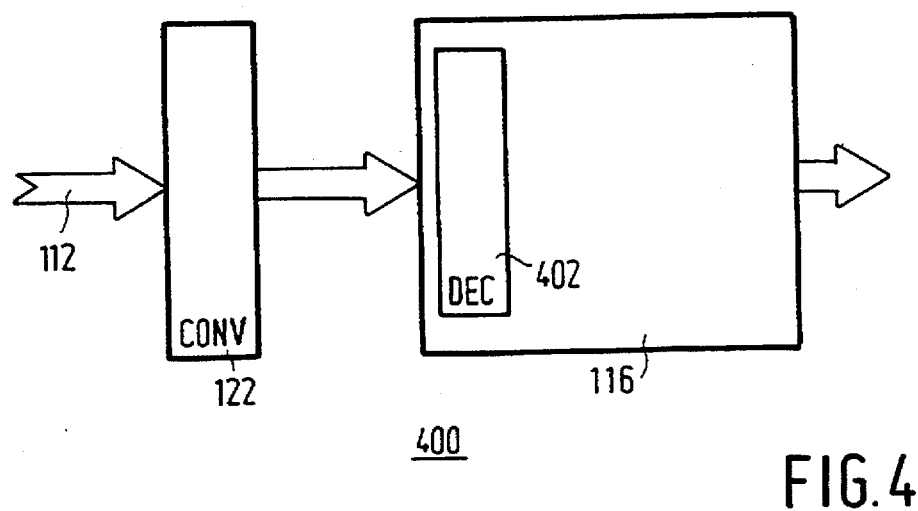
FIGS. 4 and 5 give possible architectures for a look-up table means in the invention.
Figure 5:
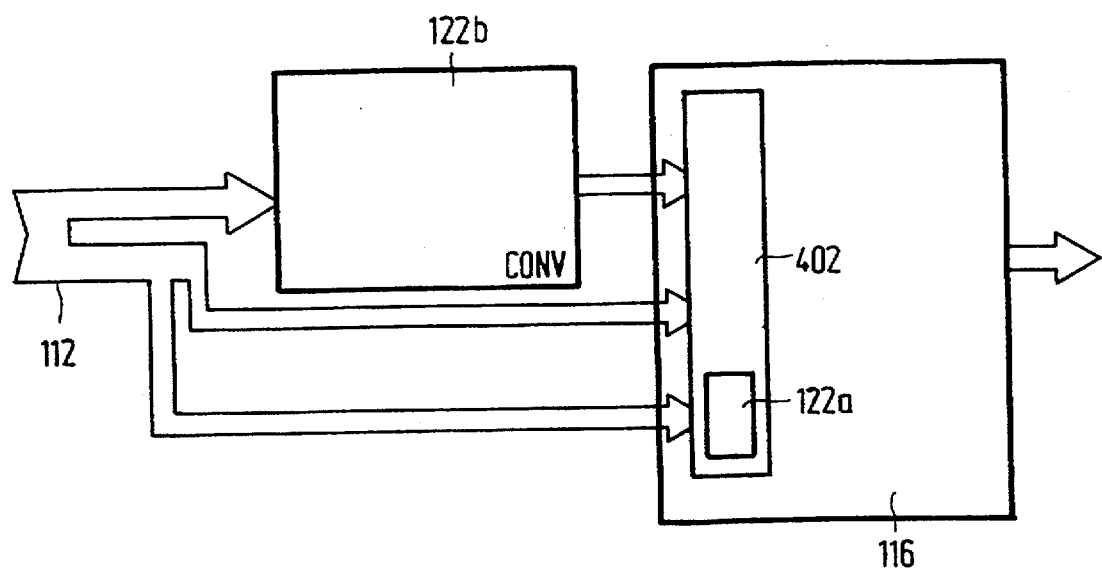

FIGS. 4 and 5 give different architectures for the look-up table means in the invention.

FIG. 4 shows a look-up table means 400 wherein memory 116 and converging means 122 are physically separated, e.g., as circuits integrated in separate semiconductor substrates or as separate circuits in a single semiconductor substrate. Memory 116 includes an address decoder 402 that receives the internal addresses generated by converging means 122.

FIG. 5 shows an architecture for a look-up table means 500, wherein the converging means is functionally composed of a portion 122a that is physically integrated with address decoder 402, and a portion 122b that is physically separated from memory 116. Note that some external addresses 112 are supplied to memory 116 via converging means 122b, some external addresses are directly supplied to address decoder 402 without a converging operation being involved, and some external addresses are supplied to converging means 122a that is merged with address decoder 402. Remaining within the scope of the invention, either part 122a or part 122b can be absent from device 500.

Conventional look-up table

In order to better appreciate the invention, a simplified example of a memory architecture for a conventional look-up table means with uniform resolution is discussed first.

Figure 6:
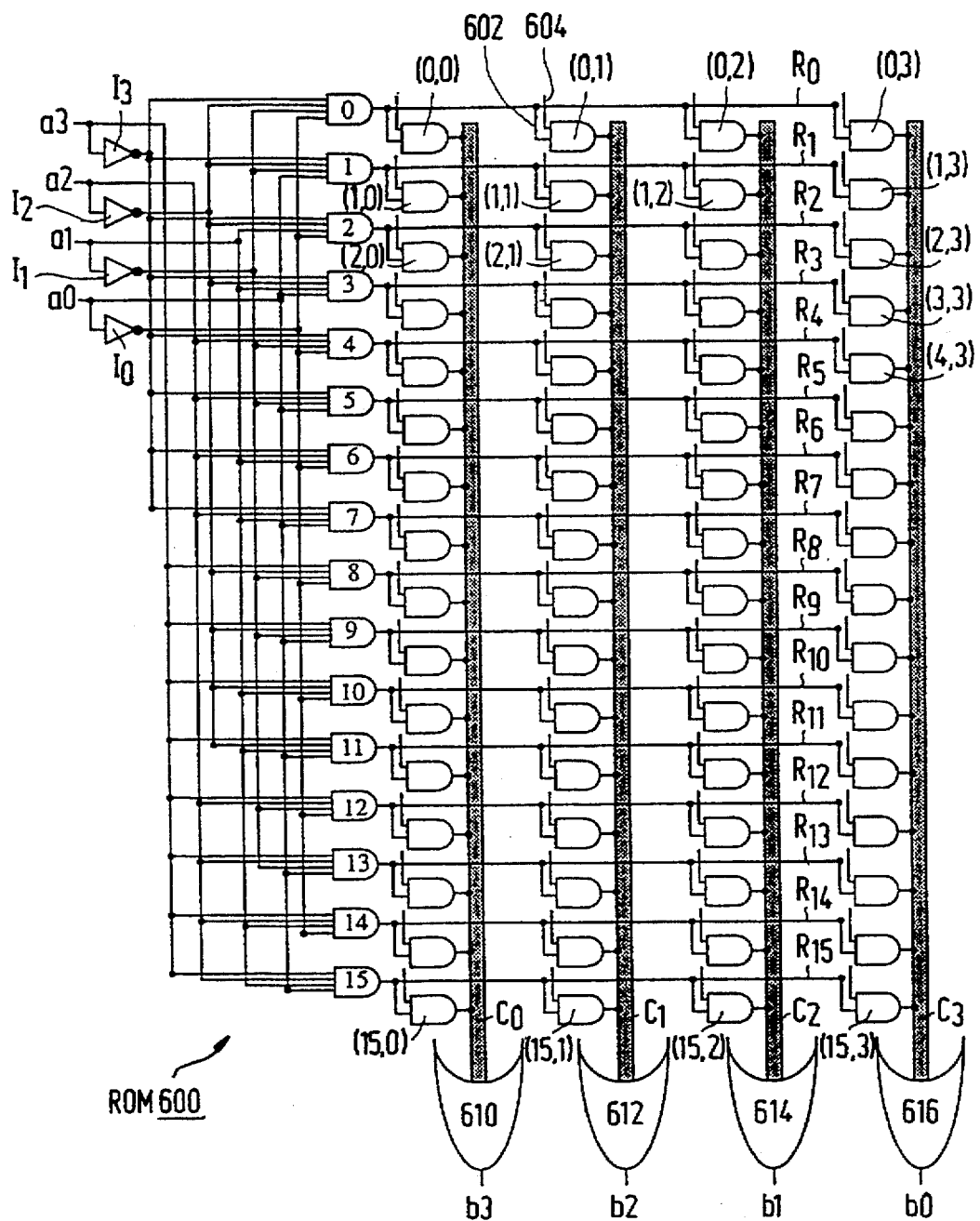
FIG. 6 gives a detailed diagram of a conventional look-up table.

FIG. 6 illustrates a functional diagram of a known read-only-memory ROM 600. Binary input signals a0, a1, a2 and a3, together with their logic complements obtained via inverters I0, I1, I2 and I3, are supplied to first AND gates 0, 1, 2, ..., 15. AND gates 0–15 serve as address decoders. For each respective logic combination of input signals a0–a3, a single, respective one of first AND gates 0–15 is activated to enable a single one of a plurality of rows R0, R1, R2, ..., R15. Each row Ri, i=0, 1, 2, ..., 15, comprises four further AND gates (i,3), (i,2), (i,1) and (i,0). Further AND gate (0,1) has a first input 602 connected to an output of first AND gate 0, and has a second input 604 for either receiving a logic low or a logic high input signal upon the ROM being conventionally programmed. Similar connections are available to the inputs of the other further AND gates but these connections are not indicated in the figure for not obscuring the drawing.

Further AND gates (0,0), (1,0), ..., (15,0) form a column C0 and have their outputs arranged to provide a wired-OR functionality, here represented separately by OR gate 610. Similarly, further AND gates (0,1), (1,1), ..., (15,1) form a column C1 and have their outputs arranged so as to provide a wired-OR gate 612, further AND gates (0,2), (1,2), ..., (15,2) form a column C2 and have their outputs arranged so as to provide a wired-OR gate 614, and further AND gates (0,3), (1,3), ..., (15,3) form a column C3 and have their outputs arranged so as to provide a wired-OR gate 616.

ROM 600 is operative to supply for each combination of input signal bits a0–a3 an associated output value b0–b3 at OR gates 610–616, depending on the programmed state, thus implementing a transfer function with a single-bit uniform resolution from input signal to output value. That is, each input signal value serves as a distinct address to access ROM 600 and to retrieve one of the transfer function values that then is provided at outputs of OR gates 610–616.

Look-up table in the invention

Figure 7:
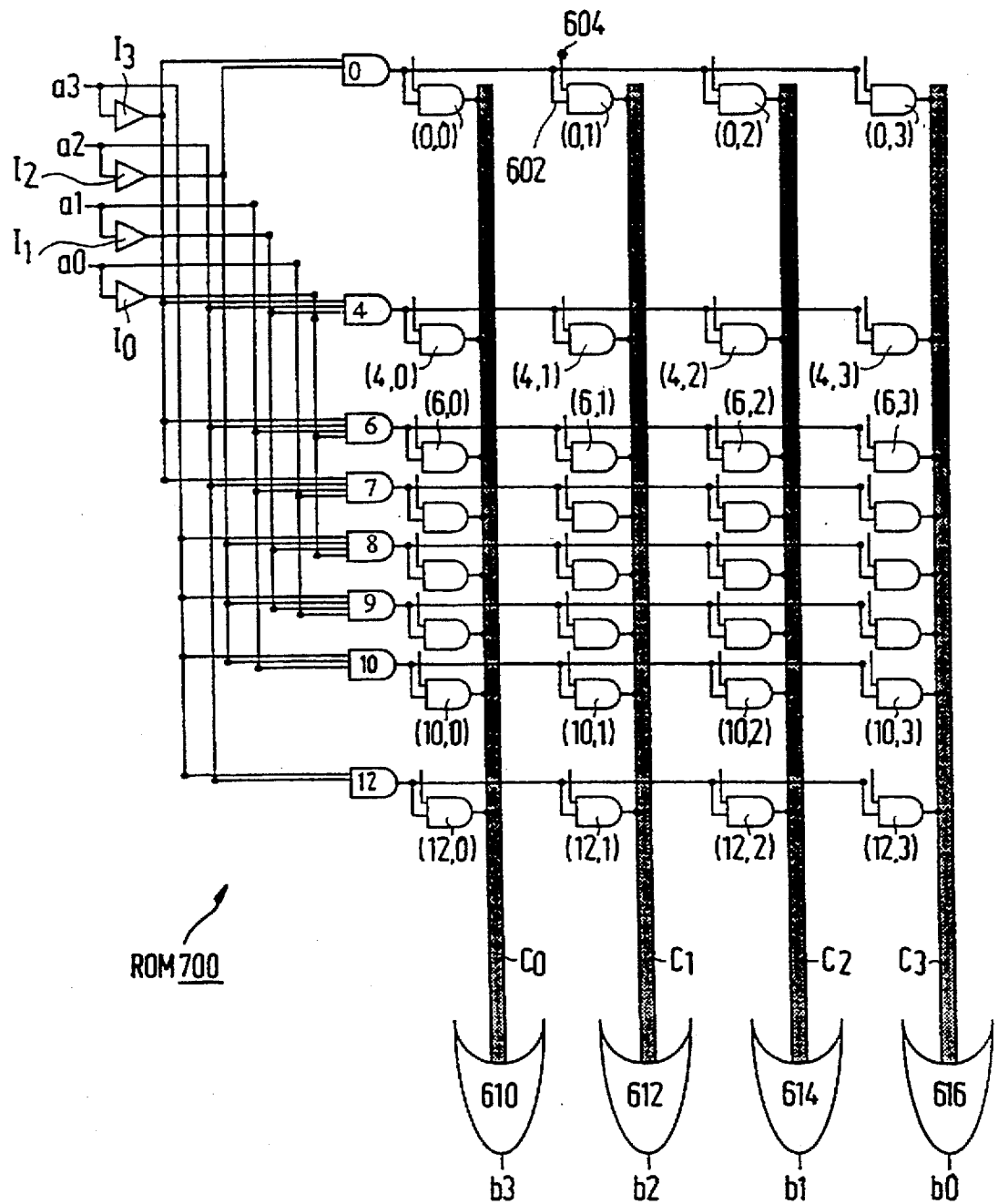
FIG. 7 gives a detailed diagram of a look-up table in the invention.

FIG. 7 gives a simplified example of a look-up table means 114 in the invention, wherein converging means 122 is functionally and physically integrated with an address decoder. Now, fewer further AND gates are employed than in the example of FIG. 6, due to the fact that some input signals (external addresses) are mapped onto the same internal address. This is accomplished by means of selectively merging the low order bits of the input signals. High resolution is obtained for input values of a0–a3 that activate further AND gates 6, 7, 8 and 9. A medium resolution is obtained for input values of a0–a3 that activate further AND gates 4 and 10, as the a0-bit is ignored. A low resolution is obtained for input values of a0–a3 that activate further AND gates 0 and 12 as the a0-bit and the a1-bit are ignored.

Note that FIG. 7 represents a simplified diagram for a look-up table. Actual implementations may include merged or segregated functionalities in order to reduce lay-out size or to enhance modular designs. The look-up table can be implemented as a PROM architecture or as a PLA architecture. In a PROM architecture, AND gates 0–15 serve as address decoders and can be hierarchically organized. For example, a 2-input AND gate receiving a pair of most significant bits is coupled to four 3-input AND gates, each receiving the output of the 2-input AND gate and two least significant bits. Such an organization reduces lay-out and voltage losses in a cascode of transistor conduction channels. A PLA has an architecture with a plurality of logic gates distributed more uniformly than in a PROM and usually consists of an AND array coupled to an OR array, having programmability features to realize an arbitrary logic function.

Symmetry in transfer function

As an additional measure to the non-uniform resolution implementation, the required memory size can be reduced even further if use is made of a symmetry property of the transfer function. A particular symmetry exists if the transfer function remains invariant under a particular operation executed on the function's independent variables.

Consider a transfer function that is a mapping of, for example, two independent variables x and y, onto a dependent variable f according to $f=f(x,y)$. The quantities x and y represent two external address words making up a single external address. Symmetry properties in one or both of the independent variables individually, such as $f(x,y)=f(-x,y)$ or $f(x,y)=-f(x,-y)$, could readily be implemented in a standard PROM or PLA using a restricted rectangular addressing domain for positive x or y only together with a polarity handling circuit. Similarly, for a transfer function of higher dimensionality, e.g., $f=f(x,y,z, ...)$ advantage can be taken of a standard memory through hypercuboidal addressing domains in case such a single-variable symmetry is present.

However, where the symmetry involves a combination of independent variables, e.g., about a line x=y, it is difficult to exploit the symmetry in a standard ROM. A solution to this kind of problem, i.e., the implementation of transfer functions having symmetry properties involving two or more independent variables combined, would be, for instance, a transformation of the independent variables to new independent variables. The latter then should be chosen so as to present the symmetry in individual ones only of the new independent variables. This conversion, if possible at all, would require an amount of pre-processing, thereby at least partially offsetting the advantage of the look-up table being simple and fast. Other types of symmetry may require additional processing as well.

A dedicated device for handling rotational symmetry is known, for example, from European Patent Application 0

220 005 that discloses a data processing system wherein a two-dimensional vector (I,Q) is to be rotated in a range up to 360°. For a given (I,Q) input vector and a given rotation angle, there is a unique output vector being the rotated input vector. Due to the symmetry in the axis I=0 and in the axis Q=0, a look-up table means is used to store all possible combinations of I and Q for the first quadrant only. The combinations belonging to the other quadrants then are created from the (I,Q) vectors in the first quadrant after appropriate modification of the sign (if necessary) and/or I-Q swapping. The modification required is determined by the actual quadrant of the input vector (I,Q). This information about the actual quadrant then is to be supplied to the look-up table means as an additional address.

Preferably, the invention therefore uses a memory for storage of function data of a basic region only, whereas the function data associated with the other regions of the function's domain are obtained through a symmetry operation. This operation then is advantageously to be implemented through a dedicated address decoder, preferably functionally integrated with the converging means. Such an approach may considerably further reduce memory size.

The data processing system then has a look-up table means for implementing a transfer function showing at least a single symmetry property. The symmetry property may involve individual ones of the independent variables or at least two independent variables jointly. The look-up table means comprises a symmetry handling means being operative to map external addresses, interrelated through the symmetry property, onto a single internal address.

Symmetry Processor

Figure 8:
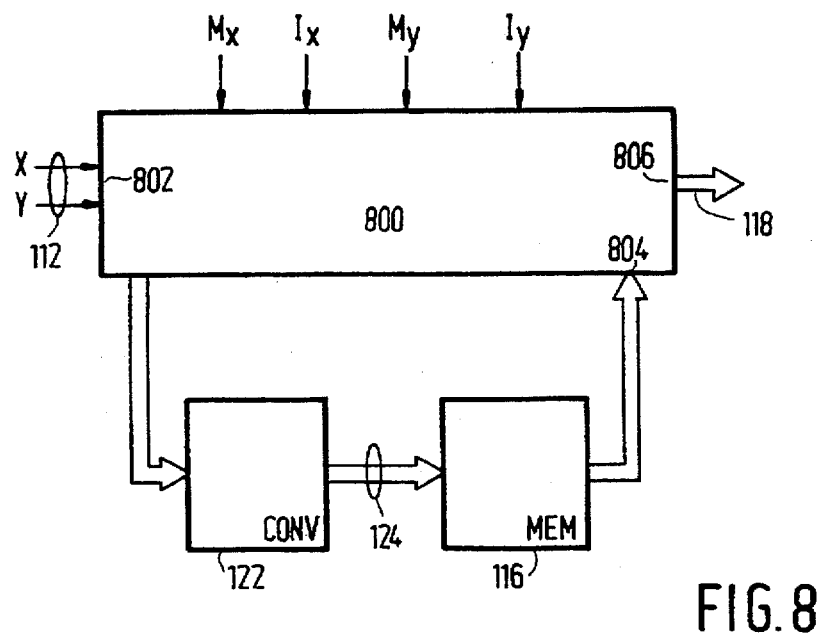
FIG. 8 gives a block diagram for a look-up table in the invention provided with a symmetry processor.

The symmetry in the invention can be dealt with through a programmable type of symmetry processor. FIG. 8 gives an example of such a symmetry processor 800 collaborating with converging means 122 and memory 116 in the invention. Symmetry processor 800 in this example is operative to receive two 8-bit external address words X and Y in two's complement representation at input 802 and supplies corresponding 16-bit words to converging means 122. The desired symmetry property is pre-specified by control of processor 800 through control inputs Mx, Ix, My and Iy. Mx is to be made a logic 1 when the transfer function is symmetrical or anti-symmetrical in X=0. Ix is to be made a logic 1 when the transfer function is anti-symmetrical in X=0. Similar conditions apply to the My and Iy control inputs. These control inputs govern the operations to be executed on the data received at input 804 from memory 116 to produce the proper function data supplied at output 806.

The symmetry property may pertain to, for instance, a mirror-symmetry, a periodicity, a sign-reversal or a combination of two or more thereof to give, e.g., an anti-mirror-symmetry (reflection plus inversion) or an anti-periodicity. Also, offset shifts can be handled as simple translations in function data relate different address domains.

Example of Symmetry Processor

Figure 9:
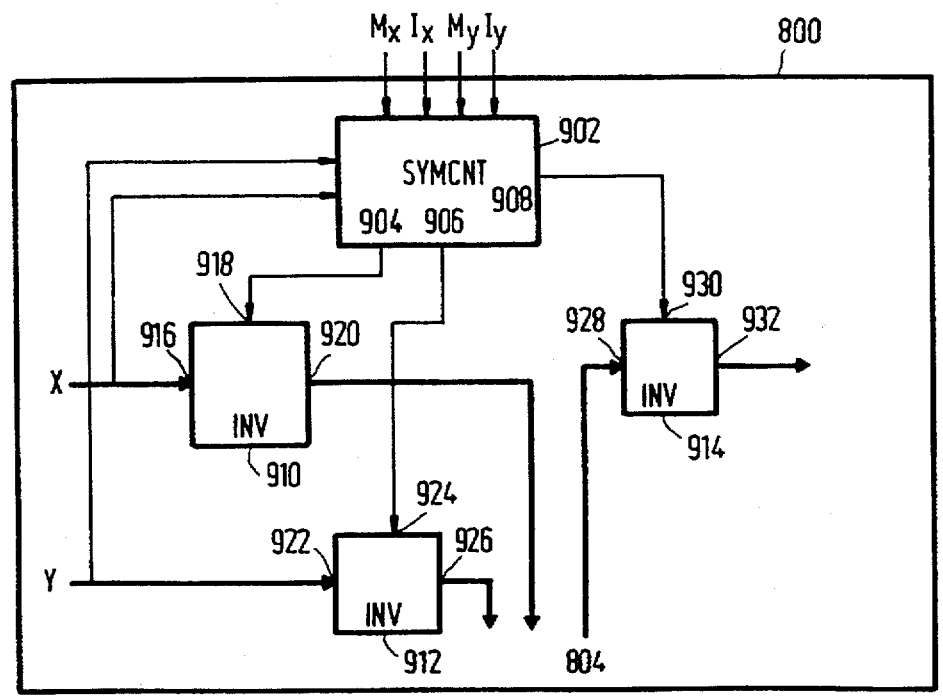
FIG. 9 gives a diagram of the symmetry processor in FIG. 8.

FIG. 9 shows an example of processor 800 composed of functional blocks. Processor 800 comprises a symmetry control block 902, having outputs 904, 906 and 908, and conditional inverter blocks 910, 912 and 914. Conditional inverter block 910 has an input 916 for receiving external address word X, a control input 918 connected to output 904 of symmetry control block 902, and an output 920 to provide either X or its inverted value depending on the status of the signal at control input 918. Conditional inverter block 912 has an input 922 for receiving external address word Y, a control input 924 connected to output 906 of symmetry control block 902, and an output 926 to conditionally provide either Y or its inverted value depending on the signal at control input 924. Conditional inverter block 914 has an input 928 for receiving data from memory 116, a control input 930 connected to output 908 of symmetry control block 902, and an output 932 to provide either the data received at input 928 or its inverted value depending on the signal at control input 930.

Symmetry control block 902 receives the most significant bit of both X and Y in order to decide if X, Y or the function data received from memory 116 is to be inverted under the reigning symmetry property specified via My, Iy, Mx and Ix. If either of these items is to be inverted, then symmetry control block 902 governs the associated one of inverters 904–908 to execute an inversion, otherwise the relevant one of conditional inverter blocks 910–914 passes the item to its output unaffected. The outputs of conditional inverter blocks 910 and 912 may be combined to provide an address for access of memory 116 through converging means 122.

Effectively, symmetry control block performs following functions:

invert X if X≦0 and My=1; (or: INVX IF (X≦0 AND My);

invert Y if Y≦0 and Mx=1; (or: INVY IF (Y≦0 AND Mx);

invert function data if (INVX AND Iy) XOR (INVY AND Ix).

Conditional Inverter Block

Figure 10:
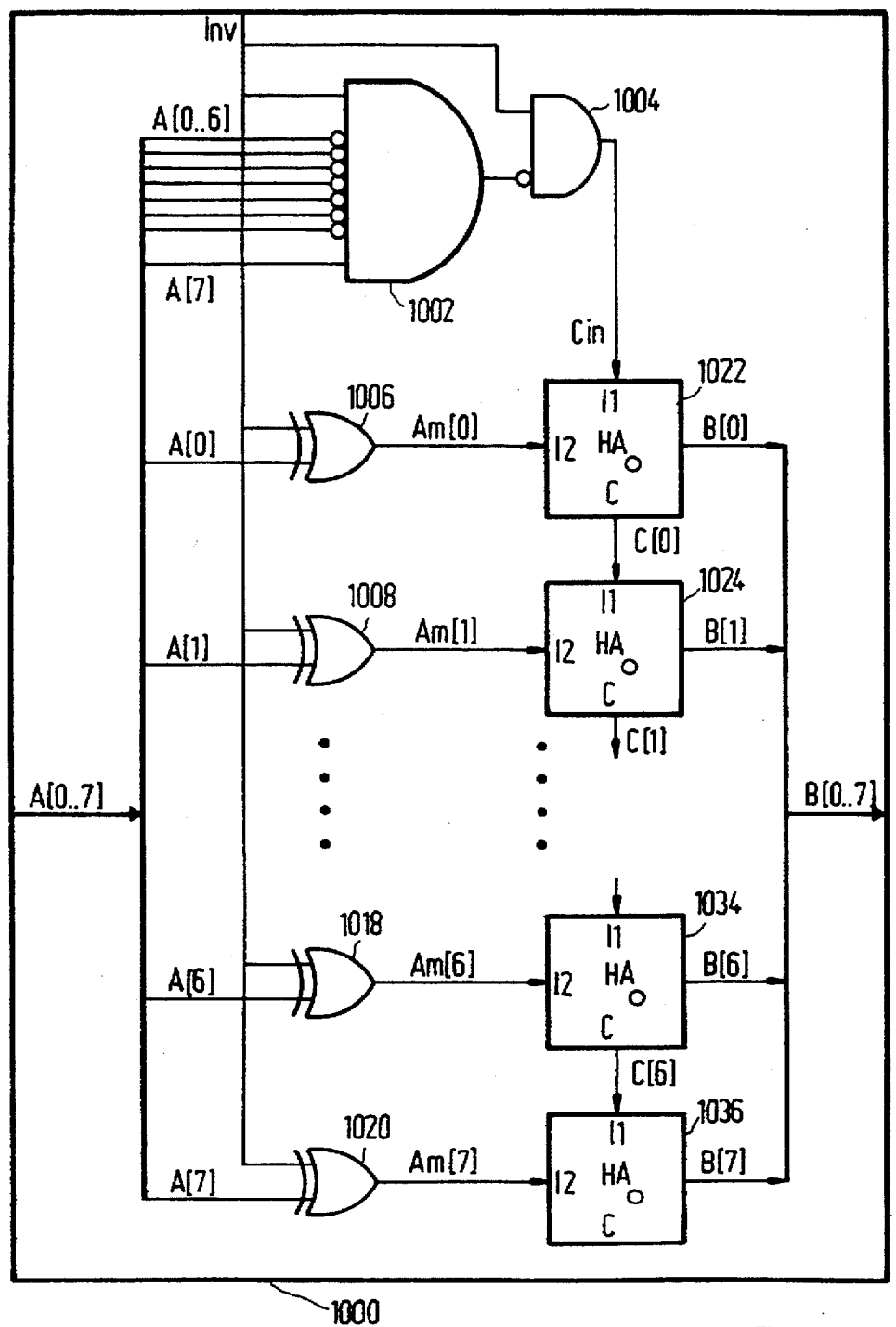
FIG. 10 gives a diagram of a part of the symmetry processor in FIG. 9.

Each one of conditional inverter blocks 910–914 preferably has a uniform architecture. FIG. 10 gives an example of a conditional inverter block 1000 for uniform use in symmetry processor 800.

Block 1000 computes the two's complement of input value A, composed of bits A0, . . . , A7, if signal INV from output 904, 906 or 908 of symmetry control block 902 is a logic 1. An exception is the input value −128, i.e., 10000000, which cannot be inverted into +128, since this number cannot be represented in 7 bits plus one sign bit. Instead −128 is inverted into +127 as 01111111, i.e., the closest value possible.

Block 1000 comprises an AND gate 1002 that computes the logical AND function of NOT A0, . . . , NOT A6, A7 and of INV in order to detect the occurrence of −128. The output of gate 1002 is inverted and connected to an input of AND gate 1004 whose other input receives INV. Block 1000 further includes XOR gates 1006, 1008, . . . , 1018 and 1020 for computing the one's complement of A0, A1, . . . , A7 when INV is a logic 1. XOR gates 1006–1020 have their outputs connected to a half-adder chain, composed of half-adders 1022, 1024, . . . , 1034 and 1036. Half-adder chain 1022–1036 is also connected to the output of gate 1004 to receive signal Cin for conditionally modifying the carry input to the incrementing circuit formed by chain 1022–1036. Half-adder chain 1022–1036 converts the one's complement into a two's complement if gate 1004 supplies the signal Cin being a logic 1, except when A equals −128. Thus the desired behaviour of a conditional inverter block is implemented.

Further Symmetry-Handling Devices

Figure 11:
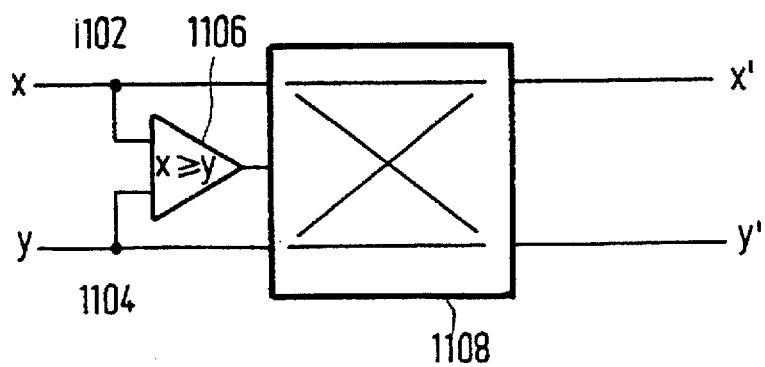
FIGS. 11 and 12 give examples of symmetry-handling devices.

FIG. 11 gives another example of a device 1100 for handling an even symmetry of the transfer function f(x,y, . . . ) about the line (or plane) x=y. The memory's size can be reduced by storing the function data for x≧y only and swapping x and y if x<y. To this end, device 1100 has inputs 1102 and 1104 for receiving variables x and y, respectively, connected to a discriminator 1106 for determining whether x≧y or x<y. If x≧y, memory 116 of FIG. 1 is supplied with x' equals x and y' equals y via switching means 1108. If x<y, then discriminator 1106 operates switching means 1108 so as to provide x' equals y and y' equals x. In this way a triangular or (hyper) pyramidal memory suffices. Device 1100 is arranged, for example, before converging means 120 of FIG. 1 or is functionally integrated therewith. Alternatively, device 1100 may be arranged between converging means 122 and memory 116 in order to directly operate on the internal address words. In case of an odd symmetry about the x=y-line or x=y-plane, the output signal of discriminator 1106 may be used to activate an inverter (not shown) arranged behind memory 116 for x<y for selectively producing function data of opposite sign.

Figure 12:
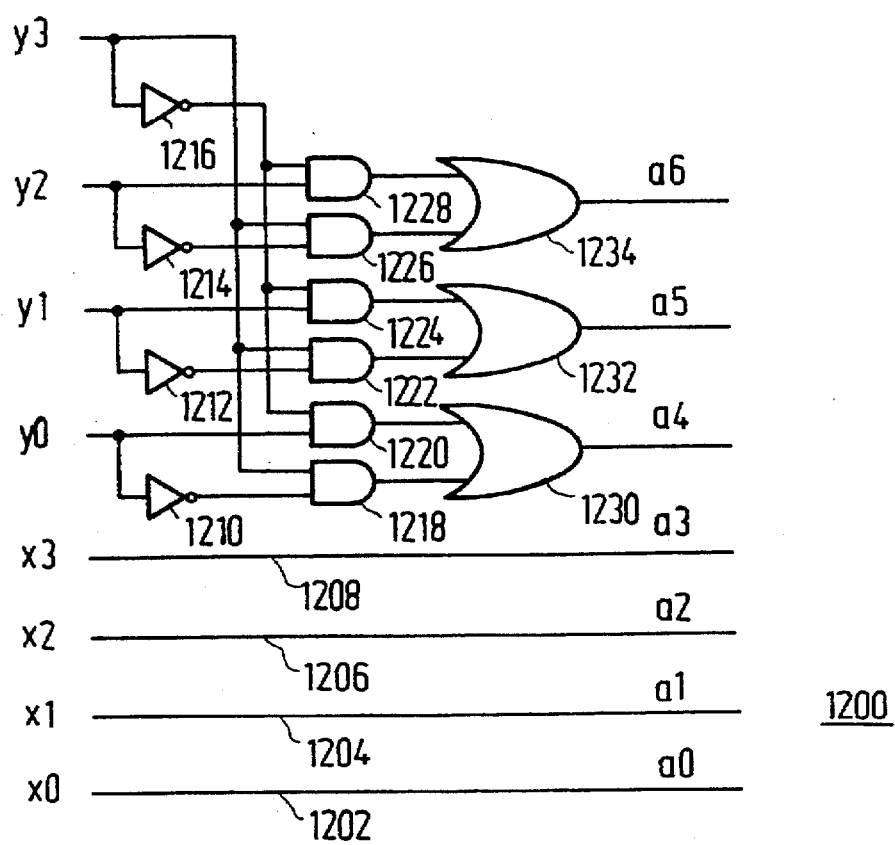

Still another device for handling symmetry is shown in FIG. 12. FIG. 12 illustrates a device 1200 handling an even-symmetrical function f(x,y)=f(x,-y). The independent variable x is represented by a word of four bits x0, x1, x2 and x3. The independent variable y is represented by a word of four bits y0, y1, y2 and y3. One's complement arithmetic is used, i.e., values of y of equal magnitude but of opposite sign are represented by words, wherein bits of equal rank have complementary logic values, and wherein the y3-bit denotes the sign of the variable y. Device 1200 comprises direct connections 1202, 1204, 1206 and 1208 for directly supplying x0–x3. Device 1200 further comprises: inverters 1210, 1212, 1214 and 1216 in order to provide the logic complement y0, y1, y2 and y3 of each of y0–y3; logic AND gates 1218, 1220, 1222, 1224, 1226 and 1228 for combining the y3-bit and its complement y3 with y1–y2 and their respective complements y0–y2; and OR gates 1230, 1232 and 1234 in order to supply logic combinations of the outputs of the logic AND gates.

As is readily seen, OR gate 1234 supplies (y2y3+y2y3), OR gate 1232 supplies (y1y3+y1y3), and OR gate 1230 supplies (y0y3+y0y3). Due to the one's complement arithmetic, OR gates 1230–1234 deliver the same address word, regardless of the sign. Again, y3 and y3 can be used to handle odd-symmetrical functions via an inverter (not shown) at the output of memory 116. Device 1200 can be used to operate on external address words when located in front of converging means 122. Alternatively, device 1200 can be used to operate on the internal address words when arranged between converging means 122 and memory 116.

Triangular Memory

Figure 13:
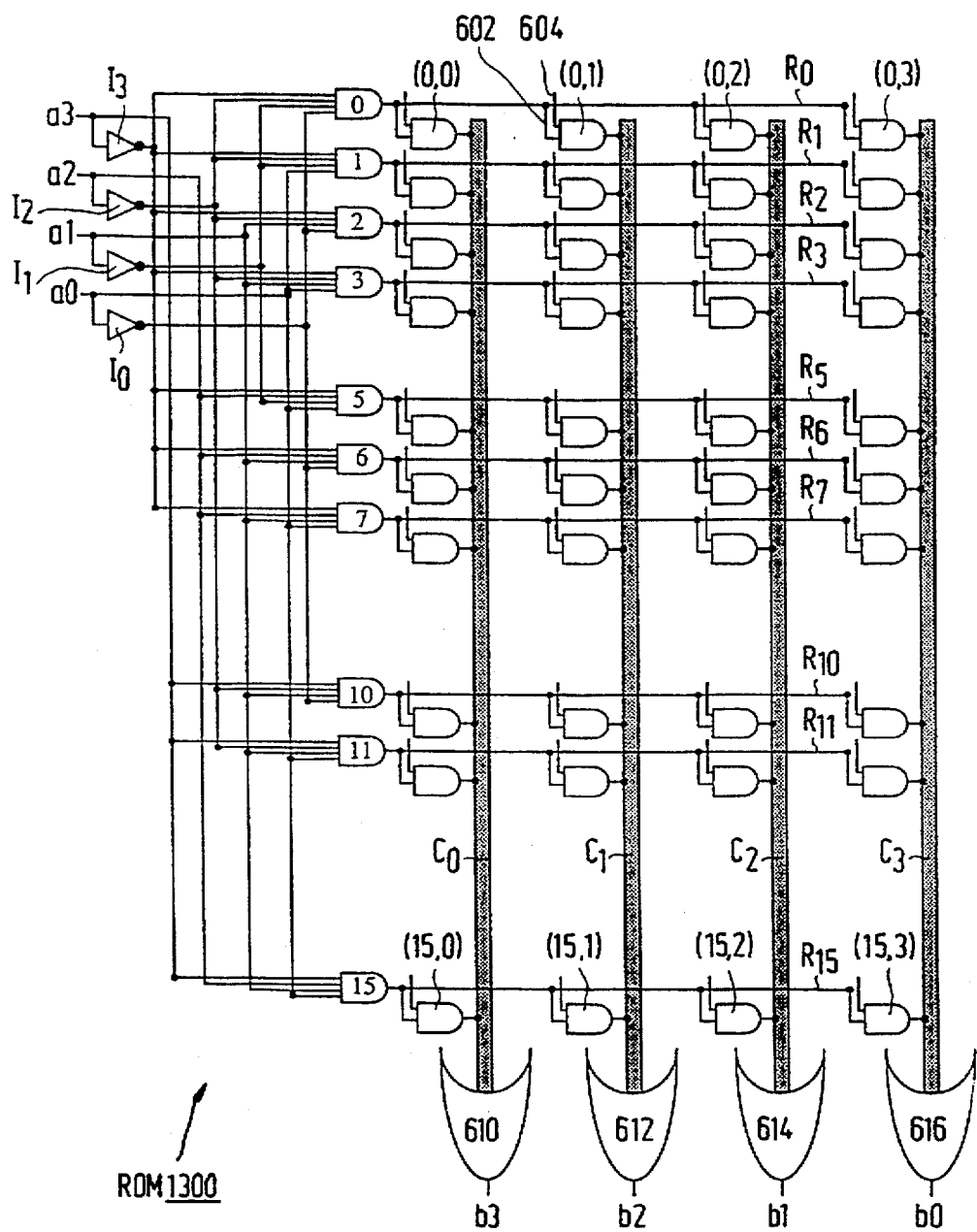
FIG. 13 gives an example of a ROM for handling a transfer function with a symmetry.

FIG. 13 gives an example of a ROM 1300 whose size is reduced when symmetry properties are employed. ROM 1300 then may be used in combination with symmetry-handling devices 1100 or 1200 for example. In order to appreciate the reduction in memory size, compare FIG. 13 to conventional ROM 600 of FIG. 6.

FIG. 13 shows a ROM 1300 for implementing a transfer function of two independent variables x and y, the function being symmetrical in the line x=y. An address supplied to memory 1300 has four bits a3, a2, a1 and a0, wherein a1 and a0 represent the x-coordinate and wherein a3 and a2 represent the y-coordinate. For an explanation of the shown elements, the reader is referred to FIG. 6. ROM 1300 has a triangular organization as is explained with reference to the table in FIG. 14 and the diagram of FIG. 15.

Table 14 gives the correspondence between addresses a3–a0 and coordinates x and y. Due to the symmetry in the line x=y, the function data for x=0, y=1 is equal to the function data at x=1, y=0. Similarly, the function data at x=0, y=2 and at x=2, y=0 are equal. Other (x,y)-pairs interrelated through the symmetry property are (2,1) and (1,2); (3,1) and (1,3); (2,3) and (3,2). Therefore, only half of the addresses interrelated through the symmetry property are needed to obtain the transfer function data in the full address domain. Those addresses that are not required are given in boldface.

The diagram of FIG. 15 visualizes the address reduction owing to symmetry in the line x=y. The addresses represented by a dot at the appropriate x,y location are the addresses needed in this example. The addresses represented by a cross are obsolete as they have mirror-symmetrical counterparts. Accordingly, ROM 1300 is to receive the dot-addresses of the triangular region only. This can be accomplished, for example, by way of symmetry processor 800 or symmetry handling devices 1100 or 1200. Comparing ROM 1300 to ROM 600 gives an indication of the savings in area for a simple two-dimensional address domain. For higher numbers of dimensions savings are progressively larger. When combined with the non-uniform resolution implementing features, the addresses supplied to ROM 1300 preferably are the internal addresses.

Maximum Memory Size Reduction

The non-uniform resolution implementations, such as converging means 122, 122a, 122b and the converging means functionally and physically integrated with the address decoder of memory 116 as in FIG. 7, serve to reduce memory size. The symmetry-handling features, such as symmetry processor 800, and devices 11 and 12 may be used with or without the non-uniform resolution implementations. A further memory size reduction can be achieved when these implementations and features are combined with interpolation means coupled to the output of the memory for producing intermediate function data that were not stored in the look-up table's memory on the basis of two or more stored function data. This approach provides a maximum reduction of memory size with regard to conventional memories.

FIG. 16 gives a diagram of such a look-up table means 1600 in the invention. Look-up table means 1600 functionally comprises a symmetry-handling element 1602, converging means 122, memory 116 and an interpolation means 1604. Interpolation means 1604 is coupled to memory 116 to receive the stored function data. Interpolation means 1604 also receives control signals based on the external addresses supplied to converging means 122 in order to produce intermediate function data from the data stored in memory 116. Preferably, symmetry-handling element 1602 functionally precedes converging means 122. As the latter is expected to be more expensive than the former, use of a small-sized converging means is cost-effective. The converging means can be down-sized when the external address domain is reduced by pre-processing in the symmetry-handling element 1602.

Note that the aforesaid parts for dealing with symmetry features can be implemented independently of the non-uniform resolution features. However, since the non-uniform resolution and the symmetry features both affect the handling of the external address words, it may be more cost-effective from the manufacturer's point of view to design a dedicated means for handling the external address words both under symmetry and non-uniform resolution conditions than under symmetry conditions alone. Also note that the parts that handle the symmetry properties can be used as devices independent of those that implement the non-uniform resolution features.

What is claimed is:

1. A data processing system with a look-up table means for implementing a transfer function with non-uniform resolution, the look-up table means having:

a memory to store a plurality of function data;

an input to receive external addresses for operating the memory;

an output to provide the function data in response to the external addresses;

wherein:

the look-up table means comprises a converging means between the input and the memory for mapping specific ones of the external addresses forming a specific address region of an external address domain onto a single specific internal address for accessing the memory;

the look-up table means is operative to receive the specific external addresses in a digital format; and the converging means is operative by selectively discarding bits of pre-specified ranks in the specific external addresses.

2. The system of claim 1, wherein the specific address region is hypercuboidal.

3. A data processing system with a look-up table means for implementing a transfer function with non-uniform resolution, the look-up table means having:

a memory to store a plurality of function data;

an input to receive external addresses for operating the memory;

an output to provide the function data in response to the external addresses;

wherein:

the look-up table means comprises a converging means between the input and the memory for mapping specific ones of the external addresses forming a specific address region of an external address domain onto a single specific internal address for accessing the memory; and the converging means is operative to discard further specific ones of the external addresses in a further specific address region of the external address domain.

4. A data processing system with a look-up table means for implementing a transfer function with non-uniform resolution, the look-up table means having:

a memory to store a plurality of function data;

an input to receive external addresses for operating the memory;

an output to provide the function data in response to the external addresses;

wherein:

the look-up table means comprises a converging means between the input and the memory for mapping specific ones of the external addresses forming a specific address region of an external address domain onto a single specific internal address for accessing the memory; and the look-up table means comprises an interpolation means coupled to the output of the memory for producing intermediate function data.

5. A data processing system with a look-up table means for implementing a transfer function with non-uniform resolution, the look-up table means having:

a memory to store a plurality of function data;

an input to receive external addresses for operating the memory;

an output to provide the function data in response to the external addresses;

wherein:

the look-up table means comprises a converging means between the input and the memory for mapping specific ones of the external addresses forming a specific address region of an external address domain onto a single specific internal address for accessing the memory;

the transfer function has a symmetry property;

the look-up table comprises symmetry handling means being operative to map at least two external addresses, which are interrelated through the aforesaid symmetry property, onto a single internal address for access of the memory; and the look-up table means comprises an interpolation means coupled to the output of the memory for producing intermediate function data.

* * * * *